US012769836B2

(12) United States Patent
Duprez et al.

(10) Patent No.: US 12,769,836 B2
(45) Date of Patent: Oct. 20, 2026

(54) METHOD TO UPDATE AN OS INSTALLED IN A SECURE ELEMENT, CORRESPONDING SYSTEM AND SECURE ELEMENT

(71) Applicant: THALES DIS FRANCE SAS, Meudon (FR)

(72) Inventors: Jerome Duprez, Coudoux (FR); Frederic Dao, Marseilles (FR); Gerald Glinka-Hecquet, Ceyreste (FR)

(73) Assignee: THALES DIS FRANCE SAS, Meudon (FR)

( * ) Notice: Subject to any disclaimer, the term of this patent is extended or adjusted under 35 U.S.C. 154(b) by 396 days.

(21) Appl. No.: 18/257,327

(22) PCT Filed: Dec. 14, 2021

(86) PCT No.: PCT/EP2021/085722

§ 371 (c)(1),
(2) Date: Jun. 14, 2023

(87) PCT Pub. No.: WO2022/129068

PCT Pub. Date: Jun. 23, 2022

(65) Prior Publication Data

US 2024/0037236 A1 Feb. 1, 2024

(30) Foreign Application Priority Data

Dec. 18, 2020 (EP) .................................... 20306620

(51) Int. Cl.

| | |
|---|---|
| ***G06F 21/57*** | (2013.01) |
| ***G06F 21/30*** | (2013.01) |
| ***H04W 8/20*** | (2009.01) |

(52) U.S. Cl.

CPC ............ *G06F 21/57* (2013.01); *G06F 21/305* (2013.01); *H04W 8/205* (2013.01)

(58) Field of Classification Search

CPC ....... G06F 21/57; G06F 21/305; H04W 8/205

(Continued)

(56) References Cited

U.S. PATENT DOCUMENTS

| | | | | |
|---|---|---|---|---|
| 2018/0089434 | A1* | 3/2018 | Sibert | H04L 63/0853 |
| 2019/0394053 | A1* | 12/2019 | Yu | H04W 12/041 |

(Continued)

FOREIGN PATENT DOCUMENTS

| | | | |
|---|---|---|---|
| KR | 101803084 | B1 | 11/2017 |
| WO | 2020201313 | A1 | 10/2020 |

OTHER PUBLICATIONS

Abdou, “Commercializing eSIM for Network Operator”, 2019, IEEE, pp. 616-620 (Year: 2019).*

(Continued)

*Primary Examiner* — Taghi T Arani
*Assistant Examiner* — Gregory A Lane

(57) ABSTRACT

Provided is a method to update an OS installed in a secure element on an OS update platform exposing the same ES9+ interface as an SM-DP+, the secure element being an eUICC or an iUICC cooperating with a terminal, the secure element and the terminal being comprised in a device. The method comprises loading an OS update script in the OS update platform of the secure element manufacturer, triggering the LPA of the terminal to connect to the OS update platform by using the ES9+ SM-DP+ protocol, downloading by the LPA the OS update script in an ISD-P of the secure element and installing the OS update script in the ISD-P of the secure element, and after the installation of the OS update script in the ISD-P, return by the secure element an execution result to the OS update platform through the LPA.

10 Claims, 1 Drawing Sheet

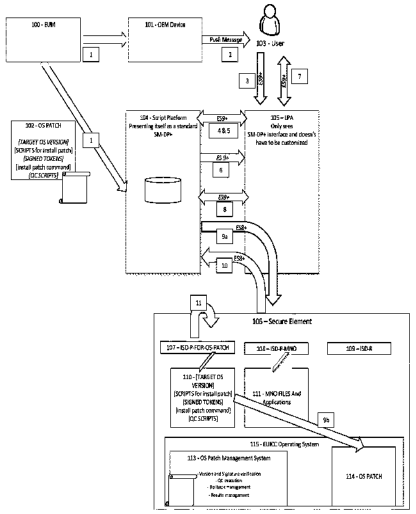

(58) Field of Classification Search
USPC .......................................................... 726/26
See application file for complete search history.

(56) References Cited

U.S. PATENT DOCUMENTS

| | | | | |
|---|---|---|---|---|
| 2020/0045544 | A1* | 2/2020 | Yu | H04W 12/35 |
| 2020/0092095 | A1* | 3/2020 | Yang | H04W 12/069 |
| 2020/0221294 | A1* | 7/2020 | Kang | H04W 12/35 |
| 2020/0314639 | A1* | 10/2020 | Yu | H04W 8/183 |
| 2020/0374686 | A1 | 11/2020 | Zhang et al. | |
| 2021/0081188 | A1* | 3/2021 | Rajagopalan | G06F 8/65 |
| 2023/0308861 | A1* | 9/2023 | Fan | H04W 12/45 |
| 2023/0360020 | A1* | 11/2023 | Nakatsugawa | G06Q 20/352 |

OTHER PUBLICATIONS

Lisowski, "SIMurai: Slicing Through the Complexity of SIM Card Security Research", 2024, USENIX, pp. 4481-4494 (Year: 2024).*
International Search Report (PCT/ISA/210) and Written Opinion (PCT/ISA/237) mailed on May 2, 2022, by the European Patent Office as the International Searching Authority for current International Application No. PCT/EP2021/085722—[15 pages].
Anonymous: "SGP.21—RSP Architecture", Feb. 27, 2017 (Feb. 27, 2017), XP055436762, Internet—Retrieved from the Internet: URL:https://www.gsma.com/newsroom/wp-content/uploads/SGP.21_v2.1.pdf—[retrieved on Dec. 20, 2017]—paragraph [4.12].
Abdou Bassem Ali: "Commercializing eSIM for Network Operators", 2019 IEEE 5th World Forum on Internet of Things (WF-IOT), IEEE, Apr. 15, 2019 (Apr. 15, 2019), pp. 616-621, XP033578639, DOI: 10.1109/WF-IOT.2019.8767260—the whole document.

* cited by examiner

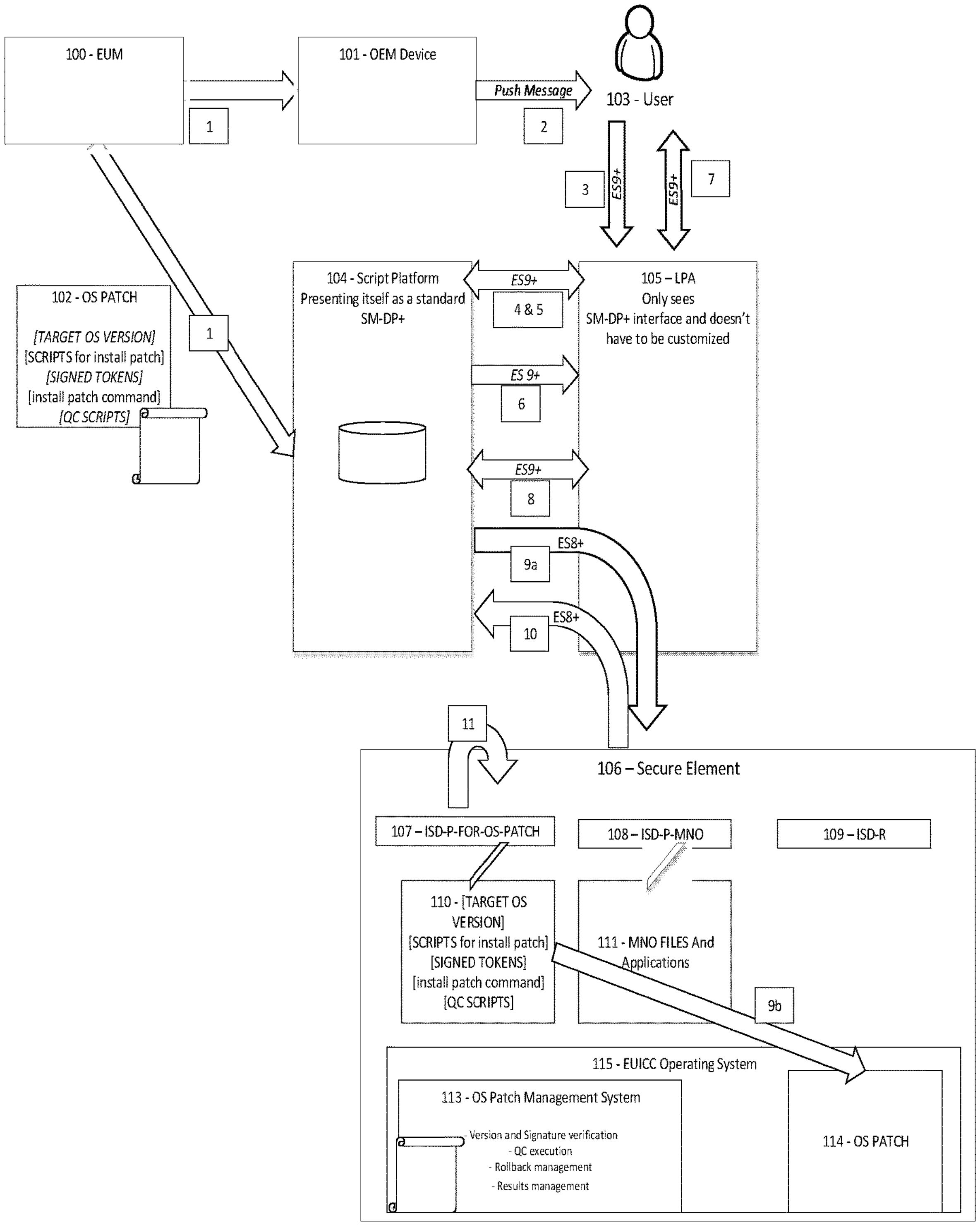
100 - EUM
101 - OEM Device
1
Push Message
2
103 - User
3
ES9+
ES9+
7
102 - OS PATCH
[TARGET OS VERSION]
[SCRIPTS for install patch]
[SIGNED TOKENS]
[install patch command]
[QC SCRIPTS]
1
104 - Script Platform
Presenting itself as a standard
SM-DP+
ES9+
4 & 5
105 – LPA
Only sees
SM-DP+ interface and doesn't
have to be customized
ES 9+
6
ES9+
8
ES8+
9a
ES8+
10
11
106 – Secure Element
107 – ISD-P-FOR-OS-PATCH
108 – ISD-P-MNO
109 – ISD-R
110 - [TARGET OS
VERSION]
[SCRIPTS for install patch]
[SIGNED TOKENS]
[install patch command]
[QC SCRIPTS]
111 - MNO FILES And
Applications
9b
115 - EUICC Operating System
113 - OS Patch Management System
- Version and Signature verification
- QC execution
- Rollback management
- Results management
114 - OS PATCH

METHOD TO UPDATE AN OS INSTALLED IN A SECURE ELEMENT, CORRESPONDING SYSTEM AND SECURE ELEMENT

FIELD

The invention concerns consumer integrated secure elements like eSIM (embedded UICCs also called eUICCs or integrated UICCs, also called iUICCs) and servers that manage such integrated secure elements for consumer products (tablets, smartphones, PDAs, telematics, especially for patching an OS (operating system). The present invention is applicable to cellular networks (3G (UMTS), 4G networks (LTE) or 5G networks), and particularly applies to automotive systems.

BACKGROUND

Patent application WO2020/201313 patches an operating system on a secure element transparently through an SM-SR platform.

SUMMARY

In this patent application, a SM-DP platform patches an operating system on a secure element embedded in a terminal.

The proposed method comprises the following steps:

i—Transmitting from the SM-DP platform to a SM-SR an order to create on the secure element an ISD-P;

ii—Establishing between the SM-DP platform and the ISD-P or the secure element a secure channel;

iii—Transmitting from the SM-SR to the secure element a patch of the operating system;

iv—Executing in the ISD-P the patch of the operating system;

v—Sending from the secure element to the SM-DP platform a message informing the SM-DP platform of the result of the execution of the patch.

A GSMA compliant eUICC or iUICC (secure element or eSIM in the following description) is soldered to devices and deployed on the field. It is managed by a set of well identified OTA platforms (SM-SR/SM-DP). A SM-SR is a Subscription Manager Secure Routing platform and a SM-DP is a Subscription Manager Data Preparation platform. The SM-DP is the entity which operators use to securely encrypt their operator profiles (a profile being a set of file system, applications, and credentials) ready for over the air installation within the secure element through the SM-SR.

The SM-SR securely delivers the encrypted operator profile to the secure element and then, once the profile is installed, remotely manages the secure element thereafter (enable, disable and delete the profile as necessary during the product's lifetime). Maintenance of the operating system and of the content of the secure element requires an OTA (Over the Air) or Internet connectivity. But applying the operating systems maintenance commands requires a specific application installed on the device that would be allowed to send commands to the eSIM.

The GSMA eSIM specifications allow an EUM (secure element manufacturer) to use proprietary commands to patch a secure element OS, but an EUM generally doesn't own one of the identified platforms above (SM-SR/SM-DP) and the identified platforms do not have management of OS patches in their scope.

Using the solution described in WO2020/201313 could be implemented for M2M secure elements, but the different architecture (no SM-SR, no direct access to the ISD-P, no possibility to execute arbitrary APDUs) makes it not applicable to a Consumer secure element.

Therefore, the scope of the invention is to propose a solution for patching an OS of a Consumer secure element without using a SM-SR.

In this respect, the invention proposes a method to update an OS installed in a secure element thanks to an OS update platform exposing the same ES9+ interface as an SM-DP+, the secure element being an eUICC or an iUICC cooperating with a terminal, the secure element and the terminal being comprised in a device, the method comprising:

Loading an OS update script in the OS update platform of the secure element manufacturer;

Triggering the LPA of the terminal to connect to the OS update platform by using the ES9+ SM-DP+ protocol;

Downloading by the LPA the OS update script in an ISD-P of the secure element and installing the OS update script in the ISD-P of the secure element;

After the installation of the OS update script in the ISD-P, returning by the secure element an execution result to the OS update platform through the LPA.

Preferably, the method comprises informing the original equipment manufacturer of the device comprising the terminal that an OS update script is available.

Advantageously, the ISD-P in the secure element is deleted after the execution of the OS update script.

Advantageously, the secure element forbids the ISD-P to be enabled if the ISD-P is not deleted.

Preferably, the loading of the OS update script includes some steps of dynamic generation of script commands in function of the features of the secure element.

Advantageously, the OS update script contains one or more PE-NonStandard commands permitting the installation and execution of the OS update script. Preferably, the content of the PE-NonStandard is itself encrypted.

The invention also concerns a system comprising an OS update platform exposing the same ES9+ interface as a SM-DP+, the system comprising a secure element cooperating with a terminal, the secure element and the terminal being comprised in a device, the secure element being able to update an OS upon receiving an OS update script of an OS update platform of the secure element manufacturer of the secure element, the terminal comprising a LPA, wherein:

the LPA is triggered to connect to the OS update platform by using the ES9+ SM-DP+ protocol;

the LPA downloads the OS update script in an ISD-P of the secure element and installs the OS update script in an ISD-P of the secure element;

after the installation of the OS update script in the ISD-P, the secure element returns an execution result to the OS update platform through the LPA.

The invention also concerns a secure element cooperating with a terminal, the secure element and the terminal being comprised in a device, the secure element being able to update an OS script upon receiving an OS update script of an OS update platform of the secure element manufacturer of the secure element, the terminal comprising a LPA, wherein:

the LPA is triggered to connect to the OS update platform by using the ES9+ SM-DP+ protocol;

the LPA downloads the OS update script in an ISD-P of the secure element and installs the OS update script in the ISD-P of the secure element;

after the installation of the OS update script in the ISD-P, the secure element returns an execution result to the OS update platform through the LPA.

The secure element can be an eUICC or an iUICC.

BRIEF DESCRIPTION OF THE DRAWINGS

FIG. 1 represents a preferred method according to the invention.

DETAILED DESCRIPTION

Other particularities and advantages of the invention will appear when reading an advantageous embodiment of the invention, which is given as an illustration and not a limitation, and referring to the appended unique FIGURE that represents a preferred method according to the invention.

In FIG. 1, several elements are represented:

A EUM 100 that generates OS update scripts that are stored in a memory of a script platform 104 (also called OS update platform) with signed tokens (for example those known as EUM certificates). The EUM 100 also cooperates with an OEM device 101 maker, for example a manufacturer of a tablet integrated in a vehicle of a user 103, or a car maker.

The LPA 105 of the device itself;

The device comprises a secure element 106, like a eUICC or a iUICC;

The secure element 106 also comprises an ISD-P (secure domain) 107 for the OS update script (its creation will be explained below), an ISDP-MNO 108 (ISD-P created to host the Mobile Network Operator profile), and an ISD-R 109 (Issuer Security Domain—Root). The secure element 106 comprises the ISD-P 107 for the OS update script, this ISD-P 107 being able to process a program or a script dedicated to install a new OS update script in the secure element 106.

A MNO files and applications repertory 111 classically integrated in a secure element;

The secure element 106 also comprises an Operating System 115, the latter comprising an OS update script management system 113 that is foreseen for:

Verifying the version of the OS update script and of its signature;

Execute the OS update script;

QC (Quality Control) scripts execution;

Rollback management intended to cancel the installation of the OS update script is something wrong happens during the installation of the OS update script;

Results management for informing the script platform 104 if the OS update script has been correctly installed.

And finally the OS update script 114 installed in the secure element 106 by the script platform 104 like explained hereinafter.

The script platform 104 behaves like a standard SM-DP+ in its interface to the LPA 105 and to the EUM 100.

These different devices having been described, a preferred method of implementing the invention will now be explained.

When the EUM 100 or service provider decides to send an update script (patch) to the target secure element 106, the steps are the followings, as represented:

At step 1, the EUM 100 sends an OS update script to the script platform 104, and optionally signed tokens. At the same time (step 1), it informs the OEM device maker 101 that an OS update script is available.

At the same step 1, the EUM 100, the OEM, or the secure element owner 100, or a Service Provider or MNO having rights to request installation of OS update scripts on the secure element 106, requests the script platform 104 to install the update script on this secure element 106.

This secure element can be an identified secure element or a batch of secure elements to be updated.

At step 2, the EUM, OEM device maker or MNO, or service provider, having access to the end-user, can then (facultative step) inform the user 103 (through an e-mail, SMS, push service, . . . ) that an OS update script is available. The end-user 103 is thus informed that he is invited to perform an operation.

The user 103 can then authorize (or not) the installation of the update script (step 3). This step can be transparent for the user 103, for example if he has previously accepted to get updates of the OS. The end user can perform a gesture (can be any of: Specific menu in the LPA; flash a QR code; click on a link; . . . ) that triggers the connection of the LPA 105 (through a ES9+ connection) to the script platform 104 (seen as a regular SM-DP+).

The EUM, MNO or OEM can also directly trigger the connection of the LPA 105 (through a ES9+ connection) to the script platform 104.

The OS update platform 104 (named "script platform" in the FIGURE) exposes the same ES9+ interface as an SM-DP+ with the LPA 105.

At steps 4 and 5 the LPA connects to the script platform using the ES9+ SM-DP+ protocol and the script platform requests to create an ISD-P (ES3.CreateISDP) 107.

At step 6, the LPA 105 downloads the OS update script in the ISD-P 107 of the secure element. In the proposed solution, the LPA only relays messages.

The script platform 104 then performs (after an optional agreement at step 7 of the user 103) an ISD-P key establishment with the ISD-P 107 on the secure element 106 through the LPA 105. This generates an SCP03 keyset (or SCP03t) known only by the script platform 104. This keyset can be used to secure SCP03 or SCP03t scripts.

The script platform 104 then generates or formats the OS update script, adds one or more signed tokens in it, and secures it using SCP03 or SCP03t (see below description of script and of signed tokens). The OS update script can also be secured with SCP03/SCP03t in advance.

At step 8, the script platform 104 sends the secured script to the LPA 105 using ES9+ protocol.

At step 9*a*, the script platform 104 sends the OS update script to the secure element 106 using ES8+ protocol. This script is received by the ISD-P 107 and sent to the OS system 115 that commands to install the patch 110 in the OS patch 114 (step 9*b*). The OS of the secure element is then updated.

At step 10, after execution of the script storage or its execution, the secure element 106 returns an execution result to the LPA 105 which forwards it to the script platform 104. This is also done by using the ES8+ protocol.

At step 11, after executing the script, if executed immediately, the eSIM can delete automatically the ISD-P 107. This is transparent to the LPA and to the user 103.

Alternatively, the secure element forbids the ISD-P 107 to be enabled if this ISD-P 107 is not deleted.

The OS update script can consist of either:

Proprietary commands, concatenated and secured within SCP03t. In this case the first command is a proprietary command indicating the nature of the script (e.g. "InstallOSPatch") instead of a SIMAlliance Profile Package ProfileHeader, or a regular SIMAlliance Profile Package, secured within SCP03t, that contains a proprietary EF which will itself contain proprietary commands (in the consumer eUICC architecture, the script cannot be proprietary APDUs secured by SCP03, as the script platform/SM-DP+ cannot send APDUs to the eUICC. This is one of the reasons why a solution described by WO2020/201313 is not directly applicable);

regular APDUs, plus optionally proprietary APDUs, secured using SCP03, or a regular SIMAlliance Profile Package, secured with SCP03t, that contains a PE-NonStandard which will itself contain proprietary commands.

In all cases, the script may contain at the end a few instructions of Quality Control (QC) that allow to check that the script is correctly executed/stored.

The content of the PE-NonStandard can itself be encrypted.

Preferably, the original equipment manufacturer of the device comprising the terminal is informed that an OS update script is available. This original equipment manufacturer can be the manufacturer of the modem of a vehicle or of a smartphone. It is thus possible to install on servers of vehicle manufacturers or smartphones OS patches. These original equipment manufacturers can then decide if they want to install an OS patch in their equipments.

The invention also concerns a system comprising an OS update platform exposing the same ES9+ interface as a SM-DP+, the system comprising a secure element cooperating with a terminal, the secure element and the terminal being comprised in a device, the secure element being able to update an OS script upon receiving an OS update script of an OS update platform of the secure element manufacturer of the secure element, the terminal comprising a LPA, wherein:

the LPA is triggered to connect to the OS update platform by using the ES9+ SM-DP+ protocol;

the LPA downloads the OS update script in an ISD-P of the secure element and installs the OS update script in an ISD-P of the secure element;

after the installation of the OS update script in the ISD-P, the secure element returns an execution result to the OS update platform through the LPA.

The invention also concerns a secure element cooperating with a terminal, the secure element and the terminal being comprised in a device, the secure element being able to update an OS script upon receiving an OS update script of an OS update platform of the secure element manufacturer of the secure element, the terminal comprising a LPA, wherein:

the LPA is triggered to connect to the OS update platform by using the ES9+ SM-DP+ protocol;

the LPA downloads the OS update script in an ISD-P of the secure element and installs the OS update script in an ISD-P of the secure element;

after the installation of the OS update script in the ISD-P, the secure element returns an execution result to the OS update platform through the LPA.

This is done thanks to an applet installed in the secure element.

Concerning the signed tokens, the script platform 104 may insert signed tokens in the script. This will allow the secure element to verify that the script has been authorized by one or more actors, as described below:

One token may be a DLOA (Digital Letter of Approval) issued by a certification authority, that delivers DLOA only after verifying compliance, and verified by the certification authority's PK stored in the eSIM's ECASD to ensure that only script that have undergone a security certification are executed;

One token may be a signature using a shared key or a key pair known only by the EUM, for example, signed by the EUM's SK.EUM.ECDSA or the SK.ECASD.ECDSA known by the EUM, and verified with the corresponding PK stored in the eSIM's ECASD to ensure that only scripts generated by the EUM system are executed;

One token may be multiply-signed by each of the MNO which own a Profile installed on this secure element, and verified using the corresponding PK stored in a well-known keyset version number and key index in each ISD-P or in each profile to ensure that only scripts approved by MNOs involved are executed;

One token may be signed by a 3rd-party's key in case the script is generated by a service provider, and verified using a key stored in the ECASD or in the service provider's Security Domain to ensure that only known 3rd-parties can affect the eSIM's OS.

Additional controls could also be used:

The eSIM 106 may check that the script platform's 104 certificates used for "common mutual authentication" or used for "profile binding" identify a well-known and allowed script platform 104 (for example, by checking the OID of the platform's certificates);

The OS script may specify an OS version, and the eSIM 106 would check the version matches its current status, and reject the script if not.

In order to simplify the user experience, the script platform 104, or the actor desiring to trigger the patching, can use a mechanism based on the SM-DS, or on a push service, or on RPM (Remote Profile Management), to trigger automatically the download and execution of the script. This would mean to replace steps 2 and 3 by a call to the SM-DS (Subscription Manager Discovery Server).

For transparency purposes, the script platform 104 may mark in the Profile metadata that the profile (indeed, the OS patch script) is a Test Profile. In this case, especially when linked to step 4, the installation and deletion can be done silently, without risking to show the "Profile" as a regular Profile in the LPA.

In the sequence described above, the LPA 105 doesn't need any proprietary feature. As soon as it can interact with an SM-DP+, it can interact transparently with the script platform 104.

The intent is not to hide the patch execution from the user, but to render the deployment of patches possible without specific development on the device side.

Specific development may still be performed in the device (especially in the LPA 105), in order to render the installation totally transparent to the end-user (automatic maintenance of the OS, or OS update performed along with device OS update), or to provide a user-friendlier user interface rendering of the patch process.

It is also possible to download a EUM patch via any SM-DP+, as long as the SM-DP+ accepts to consider patch scripts as profile scripts, and store them until delivery.

The invention applies to the GSMA eSIM specifications RSP for Consumer eUICC: SGP.22.

The invention claimed is:

1. A method to update an Operating System (OS) installed in a secure element by an Operating System (OS) update platform exposing a same ES9+ interface as a SM-DP+, said secure element being an eUICC or an iUICC, said secure element cooperating with a terminal, said secure element and said terminal being comprised in a device, said method comprising:

Loading an Operating System (OS) update script in said Operating System (OS) update platform of a manufacturer of said secure element;

Triggering a Local Profile Assistant (LPA) of said terminal to connect to said Operating System (OS) update platform, said connection using the ES9+ SM-DP+ protocol as defined by the GSMA;

Downloading by said Local Profile Assistant (LPA) said Operating System (OS) update script in an Issuer Security Domain-Profile (ISD-P) of said secure element and installing said Operating System (OS) update script in said Issuer Security Domain-Profile (ISD-P) of said secure element, said installation resulting in said update of said Operating System (OS);

After execution of said installation of said Operating System (OS), return by said secure element an execution result to said Operating System (OS) update platform through said Local Profile Assistant (LPA).

2. The method according to claim 1, wherein it comprises informing an original equipment manufacturer of said device comprising said terminal that an Operating System (OS) update script is available.

3. The method according to claim 1, wherein said Issuer Security Domain-Profile (ISD-P) in said secure element is deleted after said execution of said Operating System (OS) update script.

4. The method according to claim 1, wherein said secure element forbids the Issuer Security Domain-Profile (ISD-P) to be enabled if said Issuer Security Domain-Profile (ISD-P) is not deleted.

5. The method according to claim 1, wherein the loading of said Operating System (OS) update script includes some steps of dynamic generation in function of the features of said secure element.

6. The method according to claim 1, wherein said Operating System (OS) update script contains one or more Profile Element (PE)-NonStandard commands permitting the installation and execution of said Operating System (OS) update script.

7. The method according to claim 6, wherein the content of the Profile Element (PE)-NonStandard commands are encrypted.

8. A system comprising an Operating System (OS) update platform exposing a same ES9+ interface as a SM-DP+, said system comprising a secure element cooperating with a terminal, said secure element and said terminal being comprised in a device, said secure element being able to update an Operating System (OS) upon receiving an Operating System (OS) update script of an Operating System (OS) update platform of a manufacturer of said secure element, said terminal comprising a Local Profile Assistant (LPA), wherein:

said Local Profile Assistant (LPA) is triggered to connect to said Operating System (OS) update platform by using the ES9+ SM-DP+ protocol as defined by the GSMA;

said Local Profile Assistant (LPA) downloads said Operating System (OS) update script in an Issuer Security Domain-Profile (ISD-P) of said secure element and installs said Operating System (OS) update script in said Issuer Security Domain-Profile (ISD-P) of said secure element, said installation resulting in an update of said Operating System (OS);

after execution of said installation of said update of said Operating System (OS), said secure element returns an execution result to said Operating System (OS) update platform through said Local Profile Assistant (LPA).

9. A secure element cooperating with a terminal, said secure element and said terminal being comprised in a device, said secure element being able to update an Operating System (OS) upon receiving an Operating System (OS) update script of an Operating System (OS) update platform of a manufacturer of said secure element, said terminal comprising a Local Profile Assistant (LPA), wherein:

said Local Profile Assistant (LPA) is triggered to connect to said Operating System (OS) update platform by using an ES9+ SM-DP+ protocol as defined by the GSMA;

said Local Profile Assistant (LPA) downloads said Operating System (OS) update script in an Issuer Security Domain-Profile (ISD-P) of said secure element and installs said Operating System (OS) update script in said Issuer Security Domain-Profile (ISD-P) of said secure element, said installation resulting in an update of said Operating System (OS);

after execution of said installation of said update of said Operating System (OS), said secure element returns an execution result to said Operating System (OS) update platform through said Local Profile Assistant (LPA).

10. The secure element according to claim 9, wherein it is an eUICC or an iUICC.

* * * * *